UNITED STATES PATENT OFFICE.

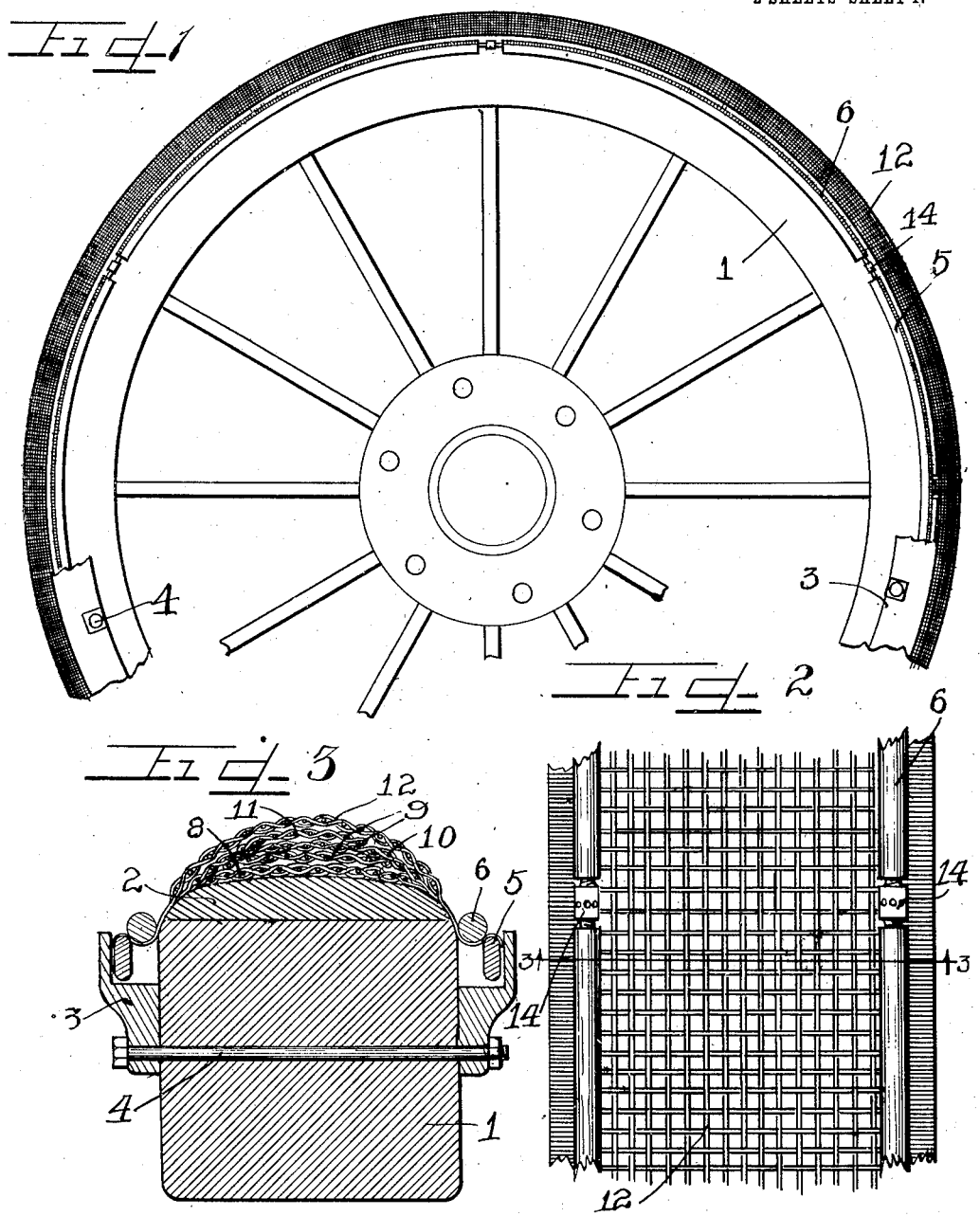

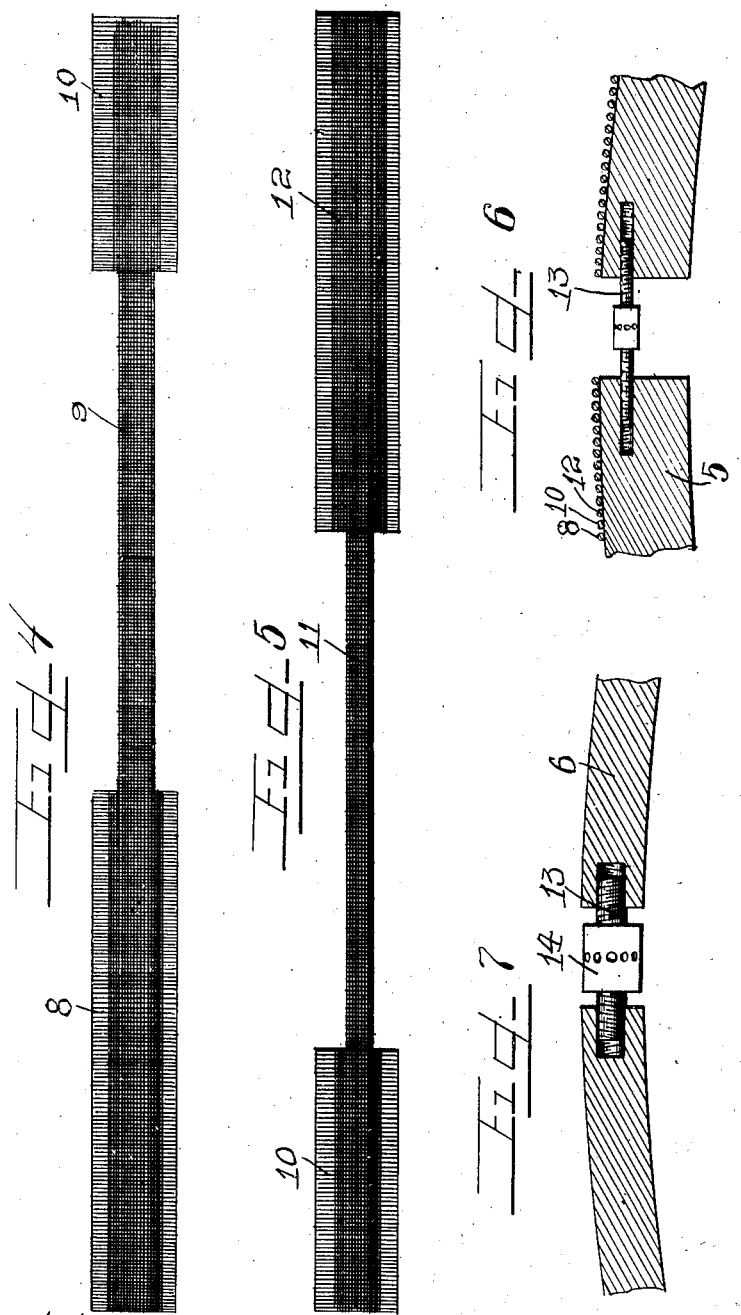

WILLIAM ROBERT MORRISON, OF CHICAGO, ILLINOIS.

TIRE OR TREAD THEREFOR.

1,063,578.  Specification of Letters Patent.  Patented June 3, 1913.

Application filed March 2, 1911. Serial No. 611,856.

*To all whom it may concern:*

Be it known that I, WILLIAM ROBERT MORRISON, a citizen of the United States, and a resident of the city of Chicago, in the county of Cook and State of Illinois, have invented certain new and useful Improvements in Tires or Treads Therefor; and I do hereby declare that the following is a full, clear, and exact description of the same, reference being had to the accompanying drawings, and to the numbers of reference marked thereon, which form a part of this specification.

This invention relates to a tire or tire tread of that class adapted to afford a yielding bearing or support for the superposed load and adapted also to afford a satisfactory frictional contact for traction purposes.

Many different types of tires and tire treads have heretofore been devised, practically all of which are subject either to the objection that they are exceedingly expensive for renewal and repair, or of such a character as to prove deficient for traction purposes.

The object of this invention is to afford a tire tread adapted to afford a yielding bearing and support for the superposed load and also to afford satisfactory traction at all times and to afford in effect a noiseless non-skidding tread.

It is also an object of the invention to afford a construction in which the tire may be quickly and easily repaired by the renewal or replacement of parts, should it become necessary.

It is an object of the invention to afford a tire adapted for use for trucks and heavy service vehicles and of such a character as to be able to withstand the severe usage to which the tires of such vehicles are subjected.

The invention consists in the matters hereinafter described and more fully pointed out and defined in the appended claims.

In the drawings: Figure 1 is a fragmentary side elevation of a wheel provided with a tire embodying my invention. Fig. 2 is an enlarged plan view, with the inner layers forming the tire not shown between the binding rims to avoid confusion. Fig. 3 is a section on line 3—3 of Fig. 2. Figs. 4 and 5 are detailed plan views, with parts omitted, illustrating the laying up of the tread by the successive superposed strips.

Fig. 6 is a fragmentary sectional view of the outwardly adjustable clamping ring. Fig. 7 is a similar view of the inwardly adjustable clamping ring.

As shown in the drawings: 1, indicates the felly of the wheel; 2, indicates the steel or other rim or tire; 3, indicates annular guard rims bolted on each side the felly by means of transverse bolts 4. Said guard rims are channeled on the inner side adjacent the felly, affording a recess on each side the wheel for the entire circumference thereof and in which are secured the outwardly expanding clamping ring 5, and the inwardly contractible clamping ring 6. Secured on said tire or rim 2, is the tire tread, in this instance, constructed as shown, of a plurality of layers 8, 9, 10, 11 and 12, of wire net, constructed of relatively large wire and coated, if desired, with rubber or other resilient material. The transverse strands of the layers 8, 10 and 12, are of a length to extend beyond the lateral longitudinal walls and to engage on the expanding clamping ring 5, in the guard channel, as shown in Figs. 2 and 6, and are secured thereto in any suitable manner. The contracting clamping ring 6, engages on the extended ends of said transverse walls, as shown in Figs. 2 and 3, and between the expanding clamping ring 5, and the felly. The intermediate layers of net 9 and 11, are arranged respectively between the layers 8 and 10, and the layers 10 and 12, and, as shown, the layer 9, is of greater width than the layer 11, thus affording an arch or convex tread. Said layers are each woven or constructed in endless bands and when fitted on the rim, fit closely thereto, and to each other, and the outermost layer 12, when drawn thereover, as shown in Fig. 3, confines all in operative position. Each of the clamping rings 5 and 6, is constructed of a plurality of segments, each provided at opposite ends respectively with right and left threaded apertures adapted to receive therein the right and left threaded turn buckle bolts 13, each of which is provided at its center with a head 14, which may be provided with apertures to receive any suitable tool for rotating the same or may be made angular to permit engagement by a suitable wrench.

The operation is as follows: In applying the tire, the guard rims are (or may be) removed from one or both sides of the wheel. The successive bands are drawn about the felly with the extended ends of the transverse wires of alternate bands engaging over the expanding clamping rings in any suitable manner and when all the bands are in place, the contracting clamping band 6, is placed over said protruding ends between the expanding clamping band and the felly, as shown in Figs. 2 and 3, and the respective turn buckle bolts are set up respectively to expand the clamping ring 5, and to contract the clamping ring 6, thereby drawing taut the successive layers forming the tread. The extended ends engaged over the expanding clamping rings may be secured thereto in any suitable manner or may be merely rigidly clamped thereby against the flange of the guard channel, thereby frictionally holding the same against the draft of the contracting expanding ring.

Any suitable reticulated bands may be employed for the purpose of building up the tread. Other materials and substances than rubber may be used to coat the bands to reduce wear.

The construction is exceedingly simple and affords an exceedingly durable and effective tire or tread having a considerable degree of resiliency and capable of resisting practically any service that is likely to be required of such structure.

Should the outer layer of the tire become worn, as, of course, it will eventually, it may be removed by simply releasing the respective clamping elements whereby the same is held in place and may be quickly restored after repair, or another may be substituted therefor and without disturbing the inner layers of the structure. Owing in part to the coating of the metal used to form the successive bands of which the tire is constructed, wear is reduced to a minimum as well as resiliency increased.

I have shown but one construction embodying my invention, although numerous modifications are obvious. I therefore do not purpose limiting the patent to be granted on this application otherwise than necessitated by the prior art.

I claim as my invention:

1. A tire tread embracing a plurality of separable layers of reticulated bands, and integral lateral members of alternate band layers extended to afford attaching means therefor.

2. A tire tread embracing in combination with a wheel and a tire thereon, a plurality of reticulated bands to fit about the tire and each other, laterally directed portions on alternate bands which project beyond the rim, and means for securing the tread to the wheel.

3. A tire tread embracing a plurality of interfitting bands arranged about the rim, the one within the other, projecting members extending from each edge of alternate bands and co-acting means carried at each side of the wheel and acting to engage said projecting portion of the bands and draw the bands tight.

4. The combination with a wheel and a rim thereon of a tire tread embracing a plurality of interfitting bands arranged around the rim one within the other, portions of alternate bands projecting on each side, and gripping means carried at each side of the wheel and acting to engage said portions to draw the bands tight.

5. The combination with a wheel of a tire tread embracing a plurality of interfitting reticulated bands arranged about the rim, one within the other, transverse strands of alternate bands extending beyond the rim and releasable gripping means at each side the wheel acting to frictionally engage said strands to hold said bands tight.

6. A tire tread embracing reticulated separable bands interfitting each other and adapted to be engaged in layers about the wheel, alternate bands of greater width than the others, a resilient coating investing each band and gripping means acting to draw the bands tight about the wheel.

In testimony whereof I have hereunto subscribed my name in the presence of two subscribing witnesses.

WILLIAM ROBERT MORRISON.

Witnesses:
 CHARLES W. HILLS, Jr.,
 GEORGE R. MOORE.